US006843518B2

United States Patent
Schlecht et al.

(10) Patent No.: US 6,843,518 B2
(45) Date of Patent: Jan. 18, 2005

(54) PROTECTIVE DEVICE FOR A LUGGAGE AREA OF A VEHICLE

(75) Inventors: Werner P. Schlecht, Vaihingen/Enz (DE); Holger Seel, Aidlingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/213,783

(22) Filed: Aug. 7, 2002

(65) Prior Publication Data

US 2003/0102691 A1 Jun. 5, 2003

(30) Foreign Application Priority Data

Aug. 7, 2001 (DE) .......................... 101 40 256

(51) Int. Cl.$^7$ ............................... B60R 21/06
(52) U.S. Cl. ................. 296/24.34; 296/37.16; 280/749
(58) Field of Search ................ 296/24.1, 37.16, 296/37.1; 280/749; 160/903, DIG. 2

(56) References Cited

U.S. PATENT DOCUMENTS

| | | | | |
|---|---|---|---|---|
| 4,168,094 A | * | 9/1979 | Yagi ...................... 296/37.16 |
| 4,202,577 A | * | 5/1980 | Breitschwerdt et al. .... 296/24.1 |
| 4,277,097 A | * | 7/1981 | Lalanne .................. 296/37.16 |
| 5,538,306 A | * | 7/1996 | Ament .................... 296/37.16 |
| 5,632,520 A | | 5/1997 | Butz ....................... 296/24.1 |
| 5,702,143 A | * | 12/1997 | Shimazaki ................ 296/24.1 |
| 6,155,621 A | * | 12/2000 | Nishida et al. ............ 296/24.1 |
| 6,547,298 B2 | * | 4/2003 | Sotiroff et al. ............ 296/24.1 |
| 6,568,732 B2 | * | 5/2003 | De Gaillard .............. 296/24.1 |

FOREIGN PATENT DOCUMENTS

| | | | |
|---|---|---|---|
| DE | 42 00 021 C2 | 5/1994 | |
| DE | 44 38 910 C1 | 3/1996 | .......... B60R/21/06 |
| DE | 100 57 572 A1 | 6/2002 | ............ B60R/5/04 |
| DE | 101 03 593 | 8/2002 | |
| EP | 03287422 | 12/1991 | |
| EP | 1207078 A2 | * 5/2002 | |
| EP | 1 207 078 | 5/2002 | |
| FR | 2 767 099 | 2/1999 | |
| FR | 2 810 935 | 1/2002 | |
| WO | WO 98/43854 | 10/1998 | |

* cited by examiner

Primary Examiner—Jason Morrow
(74) Attorney, Agent, or Firm—Greenberg Traurig

(57) ABSTRACT

Protective device for a luggage area of the vehicle. A protective device with at least one holder for the seat, at least one flexible flat structure that can be moved into at least one withdrawn functional position and into a compact resting position in the holder is prior art. According to the invention, the holder is held on a mounting system that can be moved so that the holder can be changed into at least two different positions within the vehicle. Use for station wagons.

2 Claims, 4 Drawing Sheets

PROTECTIVE DEVICE FOR A LUGGAGE AREA OF A VEHICLE

BACKGROUND OF THE DISCLOSURE

1. Field of the Invention

The invention concerns a protective device for a luggage area of a vehicle with a holding device for at least one flexible flat structure that can be moved into at least one withdrawn functional position and into a compact resting position in the area of the holding device.

2. Background Art

Such protective devices are generally familiar in vehicles. Such a protective device has a winding shaft as a holder for a flexible flat structure in the form of a cover and/or a dividing mesh that it is mounted to the vehicle in a cassette housing or another type of mount in the luggage area. The flexible flat structure is wound and unwound on the winding shaft. In resting position, the flat structure is rolled up on the winding shaft. If the winding shaft is mounted in a cassette housing, the flat structure is nearly completely within the cassette housing when rolled up in its resting position. The flat structure can be removed at least partially or completely into a withdrawn functional position either manually or by means of a drive by rolling it off the winding shaft in a corresponding matter. The holder, i.e., especially the cassette housing or the winding shaft mount is releasably held to the mount fixed to the vehicle. Especially in a station wagon with a foldable backrest, the holder must be removed to allow bulky objects to be loaded over the backrest.

SUMMARY OF THE INVENTION

It is therefore also prior art to a fix a flat structure in the form of a dividing mesh directly on to the back of the backrest arrangement. When the backrest is folded forward, the holder is simultaneously folded forward. The dividing mesh is dimensioned so that it can be pulled upward to the roof and affixed to a roof holder when the backrest is folded forward in a lying position.

The technical problem of the invention is to create a protective device of the initially-cited kind that is easier to use in comparison to the state-of-the-art.

This problem is solved in that the holding device for at least one flexible flat structure is held on a mounting system that can be moved so the holding device can be moved into at least two different support positions within the vehicle. According to the invention, the holding device can be moved on a separate mounting system that is supported independently from the vehicle seating arrangement and therefore supported independently from the backrest within the interior of vehicle. The holding device is preferably releasably mounted on the mounting system. A protective device can therefore be used in various areas of the vehicle interior without being dependent on the position of the backrest.

In one embodiment of the invention, locking elements are provided to hold the mounting system in at least three positions. The mounting system can be stably locked in each position. This is particularly advantageous if at least one flexible flat structure is designed as a dividing mesh that can extend vertically and therefore functions as a retaining mechanism for the objects in the luggage area. These locking element for the mounting system and the holder held by the mounting system ensure that striking objects will be reliably retained.

In another embodiment of the invention, the mounting system is designed as a swinging arm fixed within the vehicle that can pivot on a swiveling axis and is preferably aligned perpendicular to the vehicle axis. The swinging arms can each have a leg mirroring the other on the opposite side of vehicle. The legs can be exposed within the interior or at least partially covered by interior trim.

In another embodiment of the invention, the mounting system is preferably designed as linear mounts that can move horizontally along the length of the vehicle. This embodiment is particularly advantageous for a partially or completely adjustable rear seat arrangement since the mounting system can follow the selected position of the backrest of the rear seat.

In another embodiment of the invention, the linear mount viewed the direction of travel can be located behind a seat arrangement and held by fasteners against the backrest of the seat arrangement. This keeps the holder in the best possible forward position for at least one flexible flat structure.

In another embodiment of the invention, at least one flexible flat structure is provided whose face it is releasably connected to at least one part of the backrest. This design is particularly advantageous for a seat arrangement consisting of several parts across the width of the vehicle whereby the individual seat sections can be adjusted to different positions in reference to the lengthwise axis of the vehicle. The width of the flat structure connected to the backrest is preferably harmonized with the width of the respective backrest part so that the flat structure covers the remaining horizontal gap between the holder, especially a cassette housing, and the rear of the backrest.

In another embodiment of the invention, the front of at least one flexible flat structure extending from the holder is releasably connected to the luggage area floor. There is at least one flexible flat structure that can be pulled down to the floor from the holder that is preferably approximately at the height of the dashboard edge. Together with a vertical dividing mesh that can be pulled upward, this makes it possible to separate the luggage area across its entire height, especially when the backrest is folded down. The flexible flat structure that can be pulled downward to the luggage area floor can preferably be wound and unwound on a corresponding winding shaft in the holder. The same holds true for the above-described flat structure that can be horizontally connected to the backrest arrangement.

BRIEF DESCRIPTION OF THE DRAWINGS

Other advantages and features of the invention are found the claims as well as the following description of preferred exemplary embodiments of the invention that are illustrated with reference to the drawings.

DETAILED DESCRIPTION OF THE DRAWINGS

Figure 1:
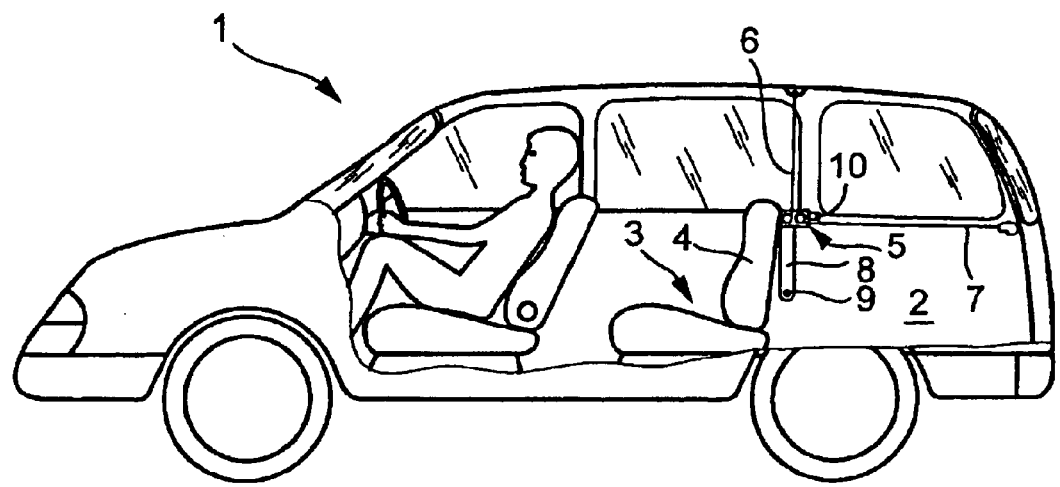
FIG. 1 shows a schematic partially cut away side view of a vehicle with an embodiment of a protective device according to the invention.
Figure 2:
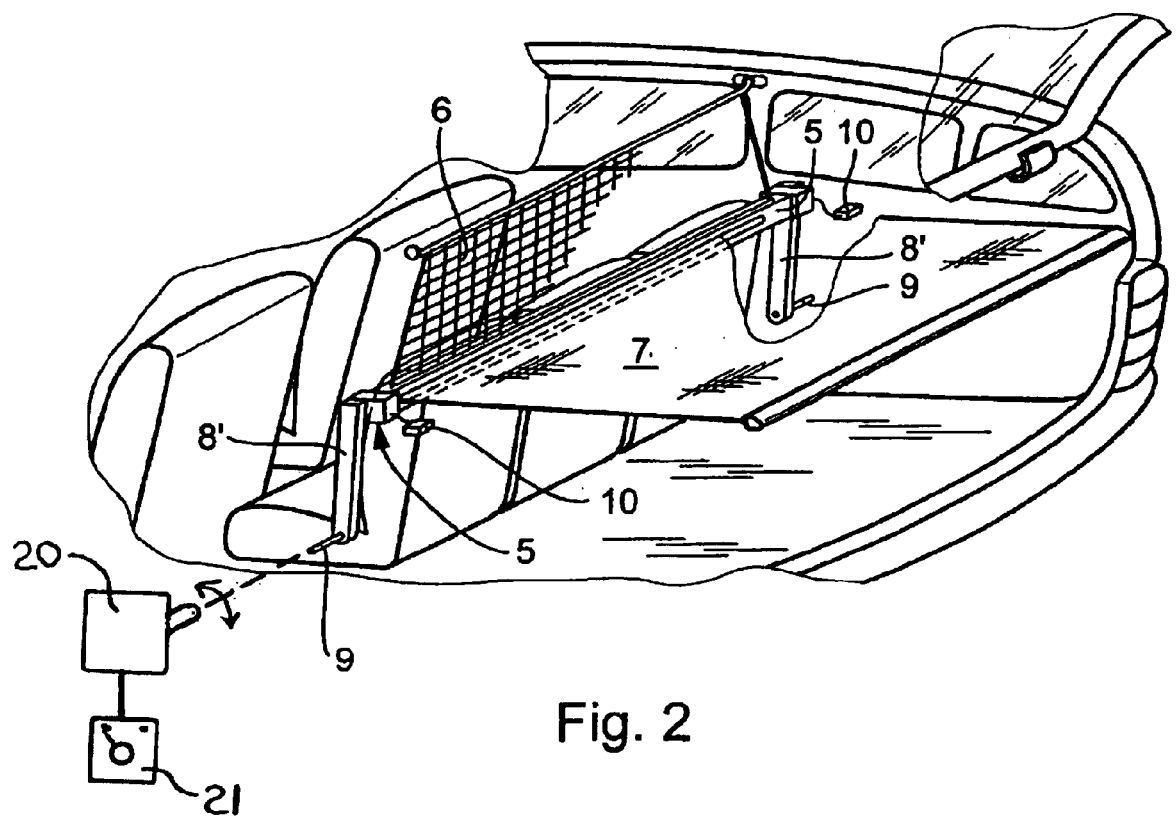
FIG. 2 shows a perspective schematic view of the protective device from FIG. 1

A vehicle 1 in the form of a station wagon has an interior with a luggage area 2 in the rear. Moving forward in the direction of travel, there is a rear seat area adjacent to the luggage area 2 that holds a rear seat arrangement 3. The rear seat arrangement 3 has a backrest arrangement 4. As can be seen in FIG. 2, the backrest arrangement 3 is divided into three sections across the width of the vehicle, whereby three individually movable adjacent seat sections are provided. Each seat section possesses one backrest section of the backrest arrangement 4.

The luggage area 2 that can be separated from the rear seat area by means of a flexible flat structure in the form of a vertically extendable dividing mesh 6 to protect the front and rear passenger areas from objects flying forward from the luggage area. In addition, the luggage area 2 is protected at the top by another flexible flat structure in the form of a horizontally stretchable cover that is approximately at the height of the dashboard especially to block the view from above. The cover 7 is preferably nontransparent. Both the dividing mesh 6 as well as the cover 7 can be rolled and unrolled on a winding shaft 11, 12 shown in FIG. 3. The two winding shafts 11, 12 are aligned horizontally perpendicular to the vehicle axis and are rotatably mounted in a cassette housing 5 serving as holder. The cassette housing 5 is firmly fixed (although it can be released) to a mounting system in the form of a swinging arm 8.

The swinging arm 8 has a bearing leg 8' on opposing sides. Both bearing legs 8' pivot on a common horizontal swiveling axis 9 aligned perpendicular to the vehicle axis with the aid of corresponding pivot bearings mounted in the vehicle.

The opposing face of the cassette housing 5 has a profile section parallel to the profile of the respective bearing leg 8' that is assigned a corresponding profile section on the respective bearing leg. By means of the profile sections, the faces of the cassette housing 5 can be inserted from above between the bearing legs and positively lock between them. Snaps are preferably provided that secure the position of the cassette housing 5 relative to the bearing legs 8'. The swinging arms 8 and hence the two bearing legs 8' are secured in their upright functional position according to FIGS. 1 to 4 by locking elements 10. A locking element 10 can be a lock or a catch that blocks the swinging arm 8 that allows the swinging arm a certain amount of movement. The swinging arm 8 is preferably assigned one stop in at least one swinging direction for the top functional position to ensure a consistent end position for the cassette housing 5 and the swinging arm 8 in the upright functional position.

Figure 3:
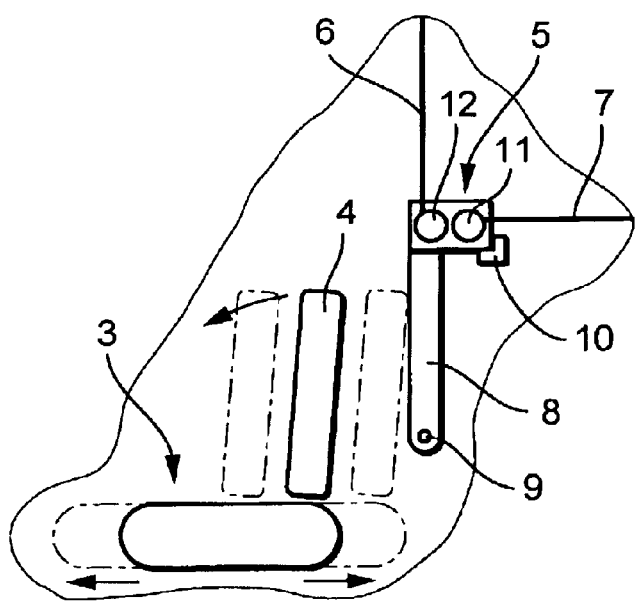
FIG. 3 shows a schematic side view of the protective device from FIG. 2.
Figure 4:
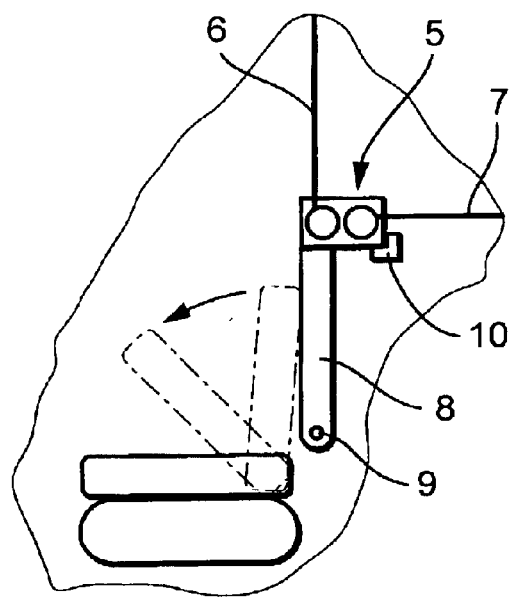
FIG. 4 shows a protective device from FIG. 3 with the backrest folded down.

As can be easily seen in FIG. 3, the cassette housing 5 including the dividing mesh 6 and the cover 7 are blocked by the swinging arm 8 in an upright functional position independent of the adjustment of the vehicle seating arrangement 3 in the lengthwise direction of the vehicle.

Figure 5:
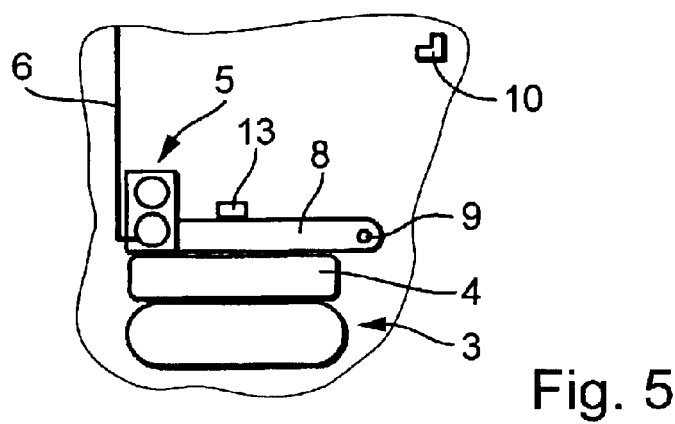
FIG. 5 shows a protective device from FIG. 4 in a bottom end position.

As can be seen in FIG. 5, the swinging arm 8 can also be moved into a swung-forward, lying functional position when the backrest arrangement 4 is folded forward in a flat, resting position. In the lying functional position, the swinging arm 8 is also assigned at least one locking element 13 that blocks the swinging arm 8 and hence also the cassette housing 5 in this functional position.

Figure 6:
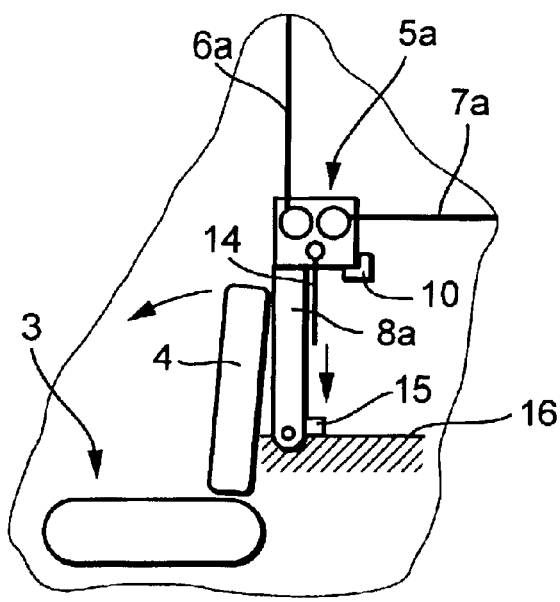
FIG. 6 shows a schematic representation similar to FIGS. 3-5 of another embodiment of a protective device according to the invention.
Figure 7:
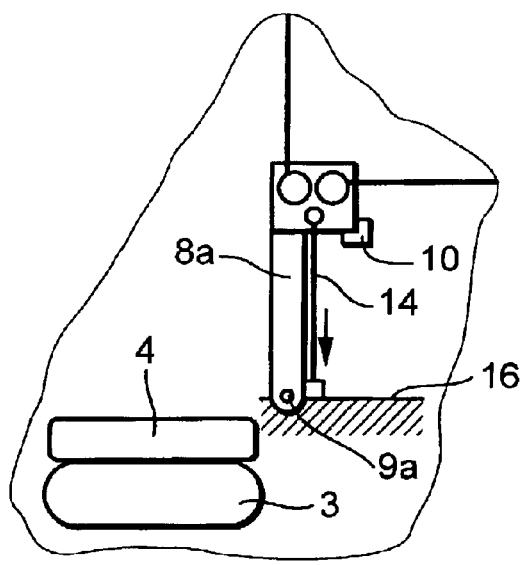
FIG. 7 shows a protective device from FIG. 6 in another position.

In the exemplary embodiment in FIGS. 6 and 7, the cassette housing 5a is also fixed to a swinging arm 8a as described beforehand with reference to FIGS. 1-5. Parts of the protective device with the equivalent function are therefore given the same reference numbers with the addition of the letter "a". A substantial difference in the embodiment shown in FIGS. 6 and 7 is that there is another flexible flat structure 14 in the cassette housing 5a that can be a rolled on and off and can be pulled down out of the cassette housing 5a to the luggage area floor 16. Fasteners 15 are affixed to the vehicle in the luggage area floor 16, and the front face of the flexible flat structure 14, preferably a pullout strip, can be releasably attached to the fasteners.

Figure 8:
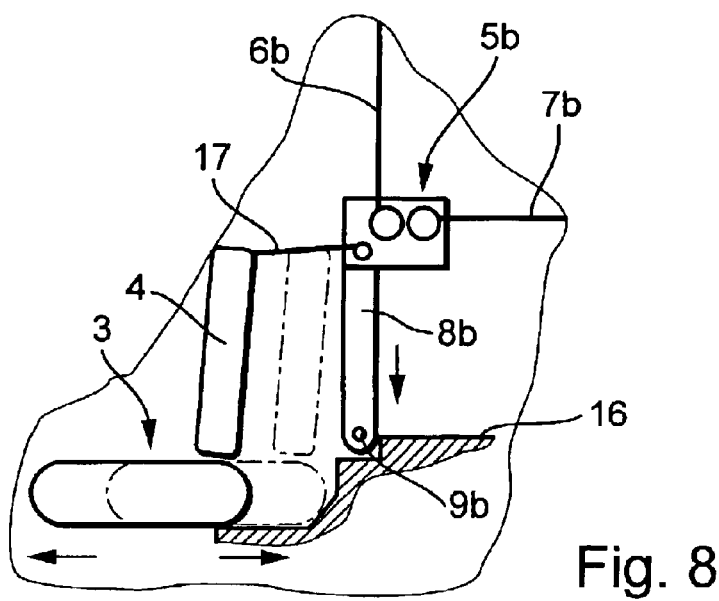
FIG. 8 shows a schematic representation similar to FIG. 3-7 of another embodiment of a protective device according to the invention.
Figure 9:
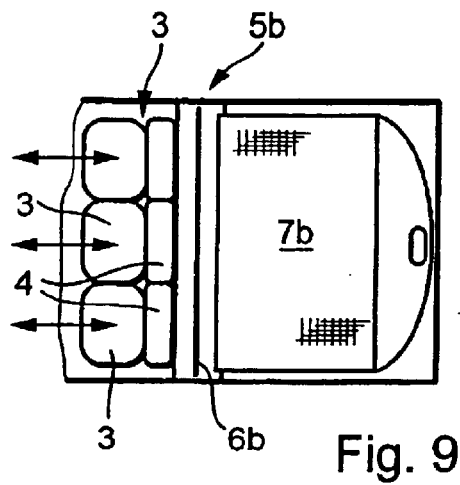
FIG. 9 shows a schematic top view of a vehicle interior provided with a protective device according to FIG. 8.
Figure 10:
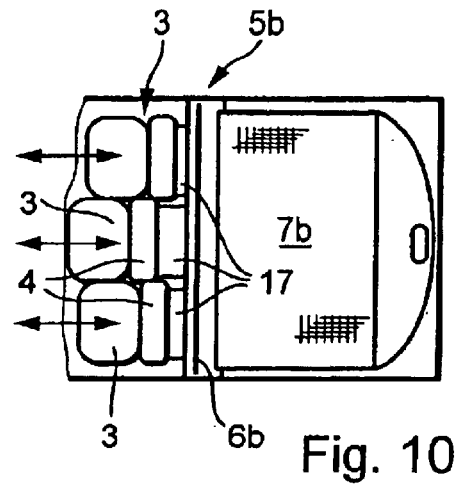
FIG. 10 shows a vehicle interior from FIG. 9 with rear seat sections in different positions.

In the exemplary embodiment in FIGS. 8-10, there is an additional flexible flat structure 17 in the cassette housing 5b which consists of three independently removable flat structures that lie adjacent to each other perpendicular to the vehicle axis. The widths of flat structures of the flat structure arrangement 17 are harmonized with the width of a corresponding backrest and serve to bridge the remaining gap between the cassette housing 5b and respective backrest position as can be seen in FIGS. 9 and 10. The cassette housing 5b is also held on a swinging arm 8b corresponding to the above-described exemplary embodiments; for further information concerning the design, please refer to the above-described embodiments according to FIGS. 1-7. Components that have the same function in the exemplary embodiment according to FIGS. 8-10 are assigned the same reference numbers with the addition of the letter "b."

Figure 11:
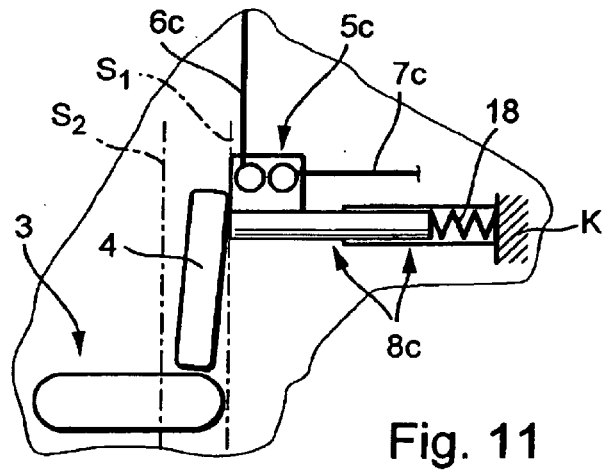
FIG. 11 shows a schematic representation of another embodiment of a protective device according to the invention in a first position.
Figure 12:
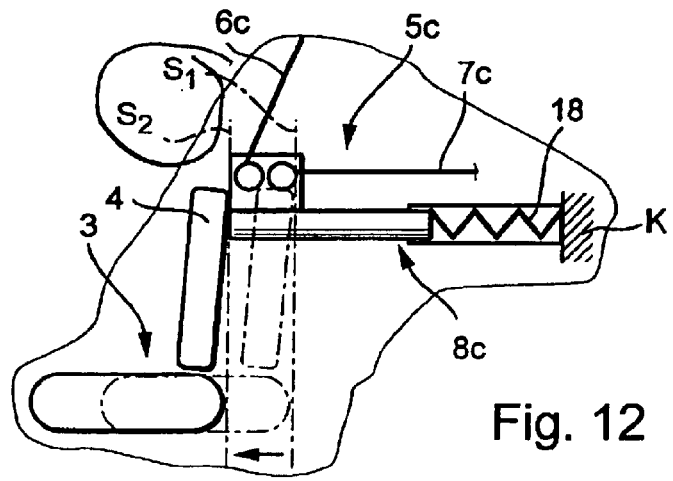
FIG. 12 shows a protective device from FIG. 11 in a second position.

In the exemplary embodiments according to FIGS. 11 and 12, a cassette housing 5c that has a vertical dividing mesh 6c and a horizontal cover 7c is held to a horizontal linear mount 8c that can move linearly in the lengthwise direction of the vehicle, and it represents a mounting system according to the invention. The linear mount 8c preferably consists of two plunger-like sections on opposite sides of the vehicle that are identically designed and are parallel to each other. The cassette housing 5c is releasably attached to these mounts. Both sections of the linear mount 8c can move linearly in tubes affixed to the vehicle that are part of the mounting system. The tubes are affixed to the vehicle on corresponding, schematically illustrated body parts K of the vehicle body. The linear mount 8c is pressed forward in the direction of travel by biasing devices 18 (preferably in the form of a pressure spring arrangement) so that it is permanently pressed against the rear of the backrest arrangement 4 of the rear seat arrangement 3. The cassette housing 5c that abuts the front face of the plunger of the linear mount 8c is pressed and held against the backrest arrangement 5. If the individual seat parts of the rear seat arrangement 3 are locked in different positions in reference to the lengthwise axis of vehicle, the cassette housing 5 and hence the linear mount 8c abuts the back-most backrest of the respective seat part.

The biasing device 18 represents a spring energy store for the linear mount 8c that drives the linear mount 8c foreword in the direction of travel.

The swinging arms described with reference to the exemplary embodiments according to FIGS. 1-10 can only be moved manually. In other exemplary embodiments of the invention, such swinging arms are assigned drives, as represented schematically in FIG. 2, by element 20, that can be mechanical, electrical, hydraulic or pneumatic. These drives can apply corresponding drive torque to the respective swinging arms in either just one direction or in both directions. A control unit (e.g., schematically illustrated control unit 21, FIG. 2) is provided to control the drives that can either be operated manually or independently by the signals of a suitable sensor corresponding to control movement commands for the swinging arm. In particular, the position of the backrest can be detected, and the swinging arm can be moved depending on the results of the determined backrest position.

What is claimed is:

1. A protective device for a luggage area of a vehicle with a holding device for at least one flexible flat structure that can be moved into at least one pulled-out functional position and into a compact resting position in the holding device, characterized in that the holding device (5, 5a, 5b, 5c) is held on a mounting system (8, 8a, 8b, 8c) that can be moved so that the holding device (5, 5a, 5b, 5c) can be movably mounted in at least two different support positions within the vehicle, wherein the holding device (5, 5a, 5b, 5c) is fixed relative to the mounting system (8, 8a, 8b, 8c), and the mounting system (8, 8a, 8b, 8c) is movable between first and second positions relative to the luggage area of a vehicle, while remaining attached to at least one interior structure of the luggage area, wherein the mounting system is preferably designed as a linear mount (8c) that can move horizontally along the length of the vehicle, and wherein the linear mount (8c) viewed from the direction of travel is located behind a vehicle seat arrangement (3) and is prompted by at least one biasing device (18) against a backrest arrangement (4) of the vehicle seat arrangement.

2. Protective device according to claim 1, characterized in that the mounting system (8, 8a, 8b, 8c) can be moved manually at least part way.

* * * * *